United States Patent
Mitchell (10) Patent No.: US 7,429,166 B2
(45) Date of Patent: Sep. 30, 2008

(54) METHODS AND APPARATUS FOR GAS TURBINE ENGINES

(75) Inventor: Stephen Craig Mitchell, West Chester, OH (US)

(73) Assignee: General Electric Company, Schenectady, NY (US)

(*) Notice: Subject to any disclaimer, the term of this patent is extended or adjusted under 35 U.S.C. 154(b) by 260 days.

(21) Appl. No.: 11/312,060

(22) Filed: Dec. 20, 2005

(65) Prior Publication Data

US 2007/0140860 A1    Jun. 21, 2007

(51) Int. Cl.
F01D 5/18    (2006.01)

(52) U.S. Cl. ............... 416/230; 416/229 A; 416/95; 415/191; 415/211.2

(58) Field of Classification Search ............... 415/191, 415/208.2, 211.2; 416/230, 229 A, 95; 244/134 R, 244/134 A, 134 B, 134 C, 134 D; 165/104.26, 165/122
See application file for complete search history.

(56) References Cited

U.S. PATENT DOCUMENTS

| | | | |
|---|---|---|---|
| 4,079,903 A | * | 3/1978 | Ashton et al. ............ 244/123.5 |
| 4,118,147 A | | 10/1978 | Ellis |
| 4,944,655 A | * | 7/1990 | Merz ........................... 416/61 |
| 5,041,324 A | | 8/1991 | Siegling et al. |
| 5,228,643 A | * | 7/1993 | Manda et al. ........... 244/134 B |
| 5,427,332 A | * | 6/1995 | Rauckhorst et al. ..... 244/134 A |
| 5,841,079 A | | 11/1998 | Parente |
| 5,975,841 A | * | 11/1999 | Lindemuth et al. ......... 415/114 |
| 6,139,259 A | | 10/2000 | Ho et al. |
| 6,688,558 B2 | | 2/2004 | Breer et al. |
| 6,848,656 B2 | | 2/2005 | Linton |
| 6,920,748 B2 | | 7/2005 | Ackerman et al. |
| 6,990,797 B2 | | 1/2006 | Venkataramani et al. |

* cited by examiner

*Primary Examiner*—Ninh H Nguyen
(74) *Attorney, Agent, or Firm*—William Scott Andes, Esq.; Armstrong Teasdale LLP (57) ABSTRACT

A method for manufacturing a turbine engine component includes forming a component to include a first side and an opposite second side, positioning at least one capillary adjacent to an external surface of at least one of the first and second sides, and securing the at least one capillary to the component with at least one composite layer.

17 Claims, 7 Drawing Sheets

METHODS AND APPARATUS FOR GAS TURBINE ENGINES

BACKGROUND OF THE INVENTION

This invention relates generally to gas turbine engines, and more particularly, to methods and apparatus for operating gas turbine engines.

Gas turbine engines typically include an inlet, a fan, low and high pressure compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as producing useful work to propel an aircraft in flight or to power a load, such as an electrical generator.

When engines operate in icing conditions, i.e., exposed to clouds of super-cooled water droplets, ice may accumulate on exposed engine structures. More specifically, if engines are operated within icing conditions at low power for extended periods of time, ice accumulation within the engine and over exposed engine structures may be significant. Over time, continued operation of the engine, a throttle burst from lower power operations to higher power operations, and/or vibrations due to either turbulence or asymmetry of ice accretion, may cause the accumulated ice build-up to be ingested by the high pressure compressor. Such a condition, known as an ice shed, may cause the compressor discharge temperature to be suddenly reduced. In response to the sudden decrease in compressor discharge temperature, the corrected core speed increases in the aft stages of the high pressure compressor. This sudden increase in aft stage corrected core speed may adversely impact compressor stall margin. In some cases, it may also lead to an engine flame out.

To facilitate preventing ice accretion within the engine and over exposed surfaces adjacent the engine, at least some known engines include a de-icing system to reduce ice accumulation on the gas turbine engine struts. However, if the gas turbine engine component is fabricated using a composite material, it is relatively difficult to anti-ice the component using heated air that is channeled through the composite component due to low transverse thermal conductivity of the composite material. As result, relatively hot air is required to de-ice the component thus penalizing the overall engine efficiency.

BRIEF SUMMARY OF THE INVENTION

In one aspect, a method for manufacturing a turbine engine component is provided. The method includes forming a component to include a first side and an opposite second side, positioning at least one capillary adjacent to an external surface of at least one of the first and second sides, and securing the at least one capillary to the component with at least one composite layer.

In another aspect, a turbine engine component is provided. The turbine engine component includes a first side, an opposite second side, at least one capillary positioned adjacent to an external surface of at least one of said first and second sides, and a composite layer securing the at least one said capillary to said component.

In a further aspect, a gas turbine engine is provided. The gas turbine engine includes at least one airfoil including a first side and an opposite second side, at least one capillary positioned adjacent to an external surface of at least one said airfoil, and a composite layer securing the at least one said capillary to said at least one airfoil.

DETAILED DESCRIPTION OF THE INVENTION

Figure 1:
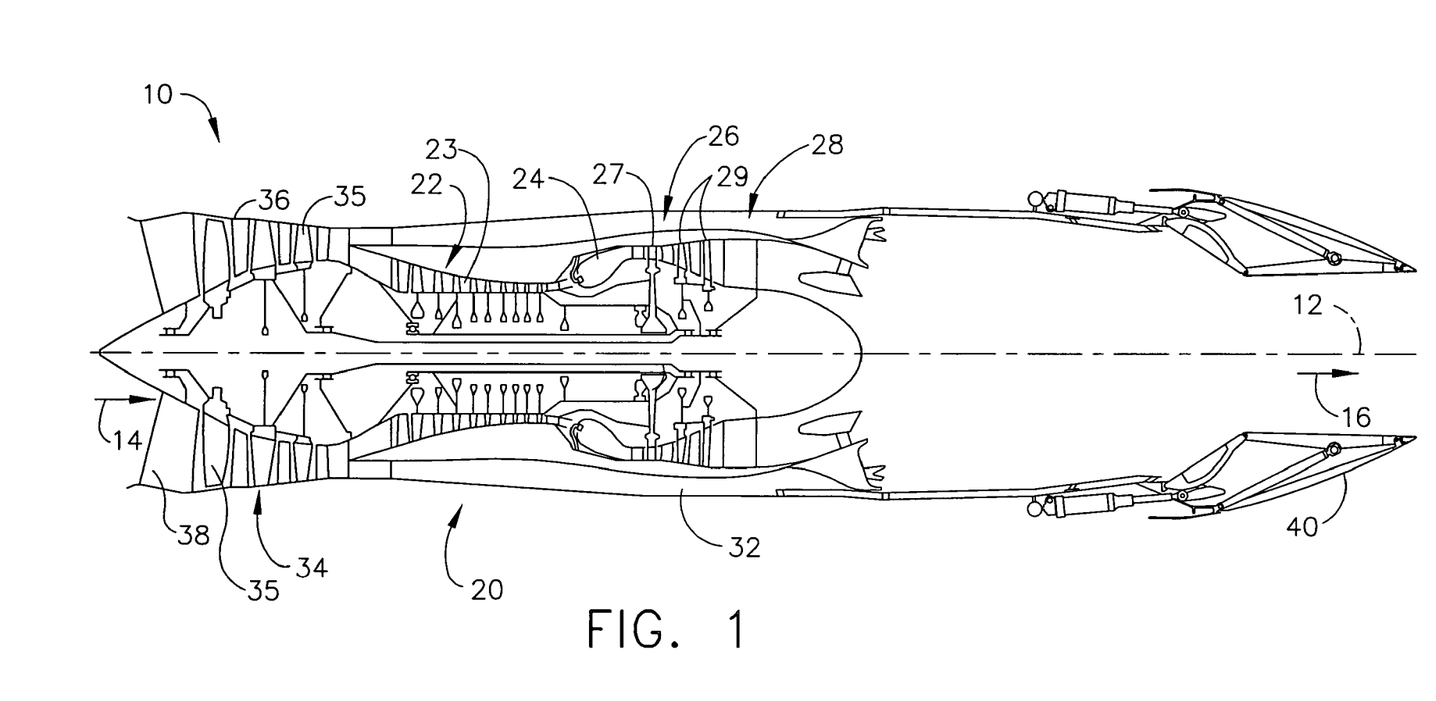
FIG. 1 is a schematic illustration of an exemplary gas turbine engine.

FIG. 1 is a cross-sectional side view of an exemplary gas turbine engine 10 that has a generally longitudinally extending axis or centerline 12 extending in a forward direction 14 and an aft direction 16. Engine 10 includes a core engine 20 which includes a high pressure compressor 22 having a plurality of blades 23, a combustor 24, a high pressure turbine 26 having a plurality of blades 27, and a power turbine or a low pressure turbine 28 having a plurality of blades 29 all arranged in a serial, axial flow relationship. In an alternative embodiment, core engine 20 includes a compressor, a detonation chamber, and a turbine arranged in a serial, axial flow relationship. Engine 10 also includes a bypass duct 32 that surrounds core engine 20, and enables fluid flow to be routed downstream from core engine 20 rather than through core engine 20. In the exemplary embodiment, engine 10 also includes a low-pressure compressor 34 that is axially upstream high-pressure compressor 22. More specifically, the low-pressure compressor 34 includes a plurality of blades 35 and is housed within a nacelle 36 that is supported by a plurality of circumferentially spaced apart struts 38.

During operation, airflow enters engine 10 through struts 38 and is channeled through low-pressure compressor 34 wherein the compressed air is introduced into core engine 20. The air and fuel are mixed and ignited within core engine 20 to generate hot combustion gases. Specifically, pressurized air from high pressure compressor 22 is mixed with fuel in combustor 24 and ignited, thereby generating combustion gases. Such combustion gases drive high pressure turbine 26 which drives high pressure compressor 22. The combustion gases are discharged from high pressure turbine 26 into low pressure turbine 28. The core airflow is discharged from low pressure turbine 28 and directed aftward towards an exhaust nozzle 40.

Figure 2:
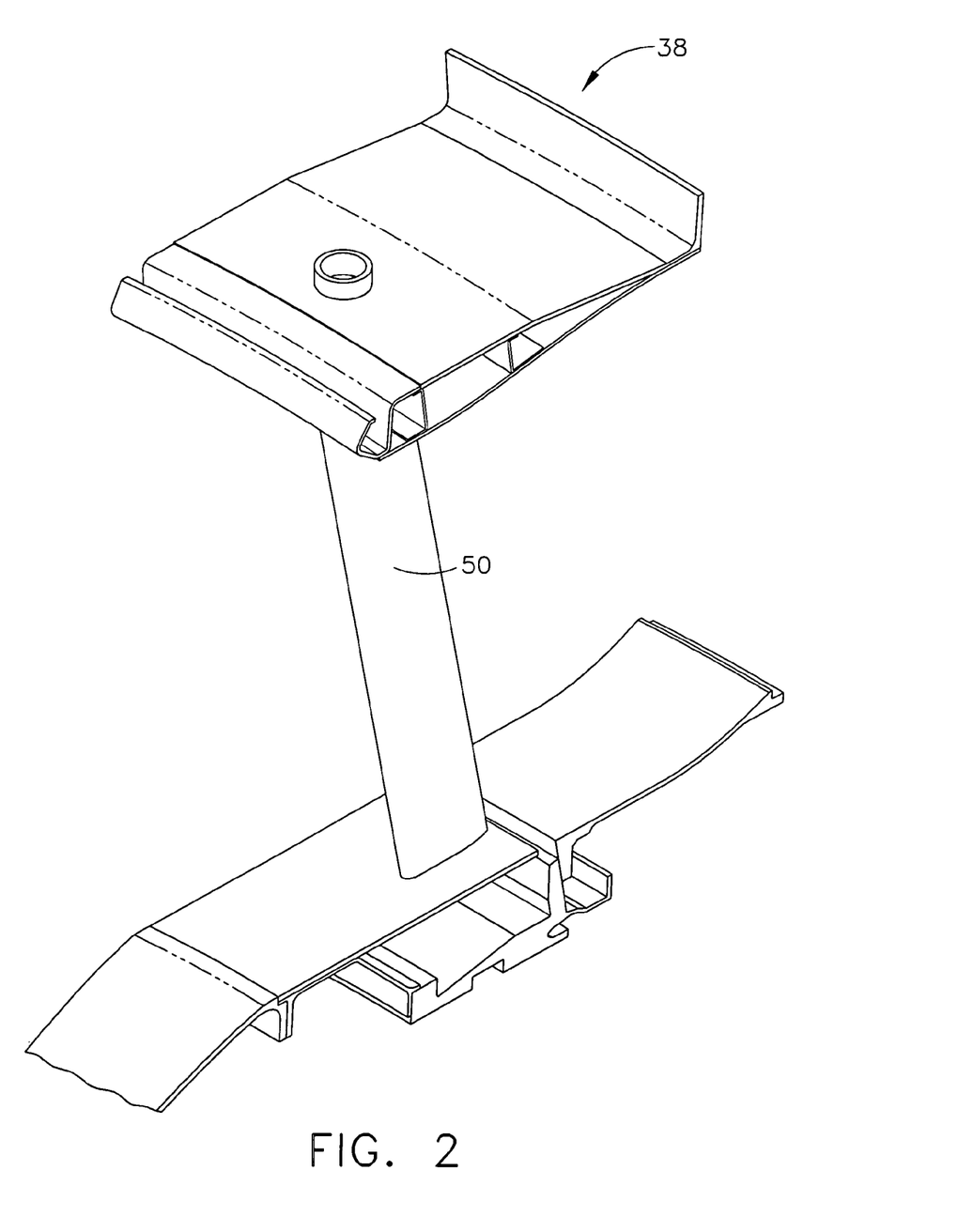
FIG. 2 an elevational, partly sectional view through the fan duct illustrated in FIG. 1 and taken generally along line 2—2.
Figure 3:
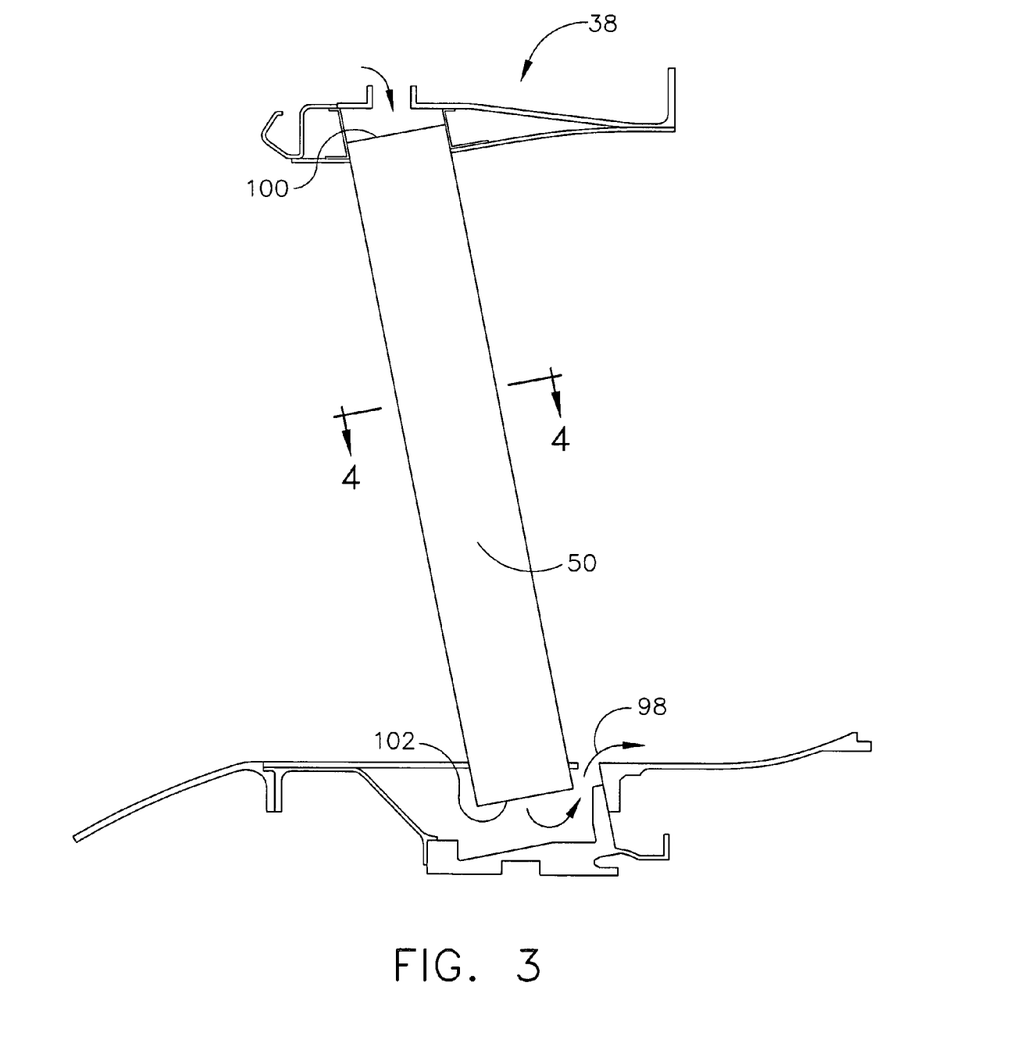
FIG. 3 is a cross-sectional view of the airfoil shown in FIG. 2.

FIG. 2 is a perspective view of an exemplary airfoil 50 that may be used with the gas turbine engine shown in FIG. 1. FIG. 3 is an elevational, partly sectional view through the airfoil 50 shown in FIG. 2. In one embodiment, the airfoil 50 is formed as part of a stationary component, such as strut 38 for example shown in FIGS. 2 and 3. In another embodiment, the airfoil 50 is formed as part of a rotating component, such as rotating compressor blade 35 for example.

Figure 4:
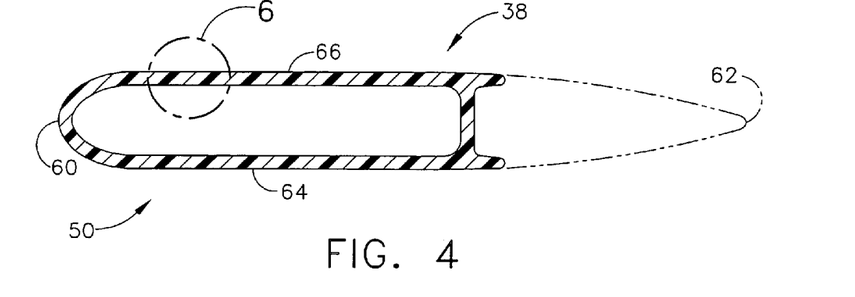
FIG. 4 is top cross-sectional view of an exemplary airfoil.

As one example, FIG. 4 illustrates airfoil 50 manufactured as part of the exemplary strut 38. As such, airfoil 50 includes a leading edge 60, an axially opposite trailing edge 62, a radially inner root (not shown), an opposite radially outer tip (not shown), and circumferentially opposite first and second sides 64 and 66 extending therebetween. In one embodiment, struts 38 are aerodynamically streamlined in a generally symmetrical tear drop shape for minimizing flow obstruction. Optionally, struts 38 are not tear drop shaped.

Figure 5:
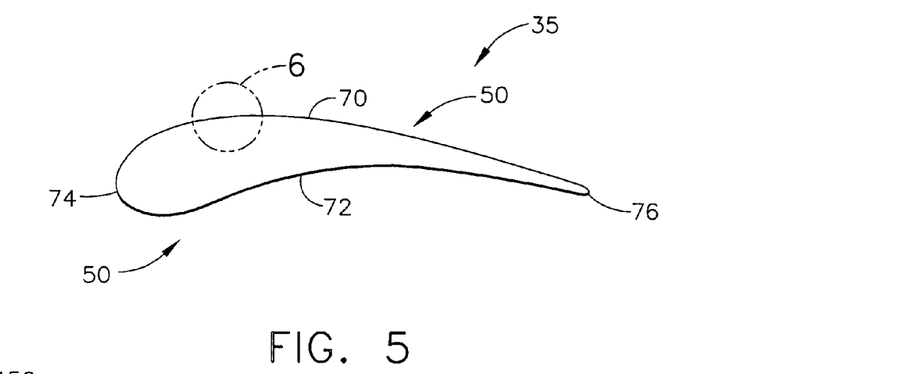
FIG. 5 is a top cross-sectional view of an exemplary airfoil.

As another example, FIG. 5 illustrates one of the compressor blades 35 that may be manufactured in accordance with the methods described herein. As such, compressor blade 35 includes airfoil 50 that includes a first contoured sidewall 70 and a second contoured sidewall 72. First sidewall 70 is convex and defines a suction side of airfoil 50, and second sidewall 72 is concave and defines a pressure side of airfoil 50. Sidewalls 70 and 72 are joined at a leading edge 74 and at an axially-spaced trailing edge 76 of airfoil 50. More specifically, airfoil trailing edge 76 is spaced chordwise and downstream from airfoil leading edge 74. First and second sidewalls 70 and 72, respectively, extend longitudinally or radially outward in span from a blade root (not shown) that is positioned adjacent a dovetail (not shown), to an airfoil tip (not shown).

As such, airfoil 50 may be fabricated to include a platform and dovetail to enable the airfoil 50 to be coupled to a rotating disk or airfoil 50 may be integrally formed with a disk conventionally referred to as a blisk without a discrete and removable dovetail. Optionally, airfoil 50 may be utilized with a stationary component such as strut 38.

Figure 6:
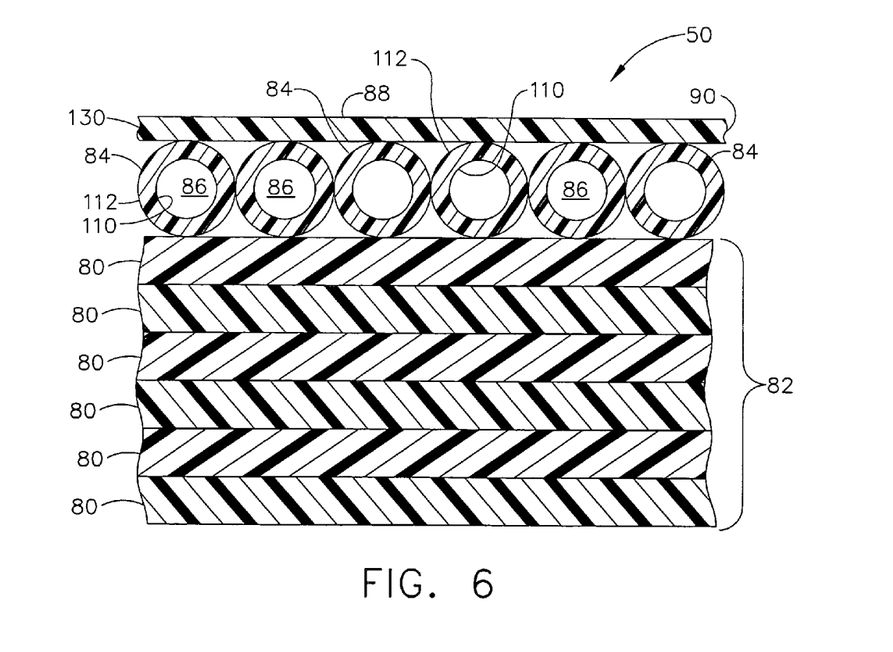
FIG. 6 is a top cross-sectional view of an airfoil that includes a plurality of capillaries.

FIG. 6 is a top cross-sectional view of airfoil 50 that may formed as part of a rotating blade or a stationary strut. In the exemplary embodiment, airfoil 50 is fabricated to include a first side and a second side. More specifically, airfoil 50 includes a plurality of composite plies 80 that are bonded together to form a portion 82 of airfoil 50. In the exemplary embodiment, the composite plies are fabricated using a carbon or glass composite material that are bonded together to form a portion 82 of airfoil 50.

Airfoil 50 also includes at least one capillary 84 that is coupled to an external surface of portion 82. Capillary as used herein, represents a tube having a relatively small opening extending therethrough. In the exemplary embodiment, airfoil 50 includes a plurality of capillaries 84, each having an opening 86 extending therethrough that is sized to receive a heated airflow therethrough, the heated airflow being sufficient to reduce or eliminate ice formation on an exterior surface 88 of airfoil 50.

As shown in FIG. 6 the plurality of capillaries 84 are arranged between portion 82 and an external composite layer 90 that is utilized to secure the plurality of capillaries 84 to portion 82. More specifically, the capillaries 84 are arranged such that the openings 86 extend in a radial direction along the exterior surface of portion 82. As such, a heated airflow 98 is channeled from a source, such as compressor bleed air, for example, into a radially outward end 100 of airfoil 50, through opening 86, and the heated air is then discharged through a radially inward end 102 of airfoil 50, as shown in FIG. 3.

Referring back to FIG. 6, in the exemplary embodiment, each capillary 84 includes a substantially cylindrical body having an inner surface 110 that defines opening 86 and an external surface 112. In the exemplary embodiment, capillaries 84 are coupled between portion 82 and an external composite layer 90 such that the external surface 112 of each capillary 84 is proximate to the external surface 112 of an adjacent capillary 84. As such, a first quantity of capillaries 84 are coupled to airfoil 50 to facilitate maximizing the quantity of heated airflow that is channeled through the capillaries 84 and therefore facilitate maximizing the external surface area of the airfoil that is heated. In the exemplary embodiment, capillaries 84 are fabricated using a glass material such as, but not limited to, quartz, for example.

After the capillaries 84 are positioned proximate to airfoil portion 82, a composite layer 90 is wrapped around airfoil portion 82. The airfoil assembly including airfoil portion 82, capillaries 84, and composite layer 90 are then heat treated to form a finished airfoil 50.

Figure 7:
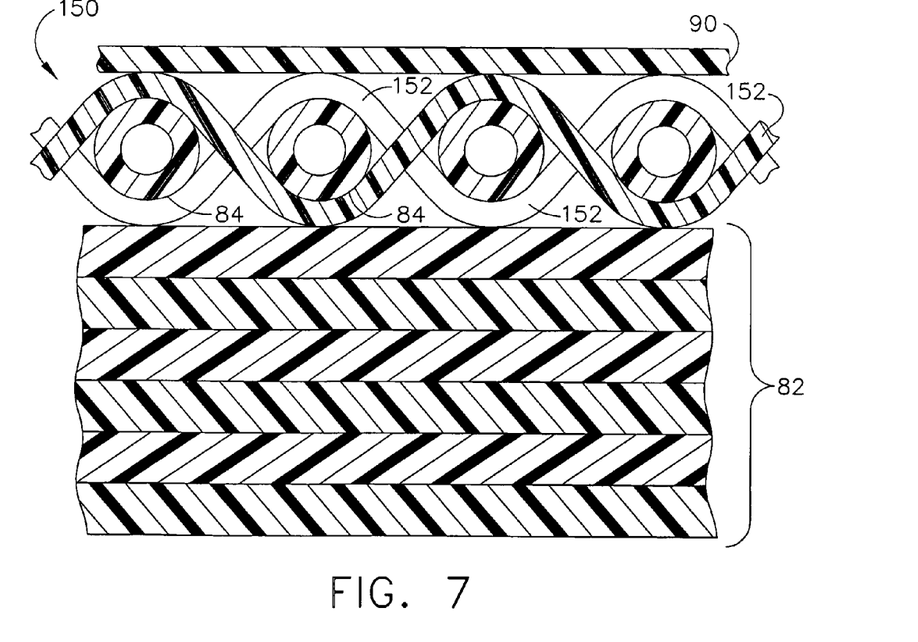
FIG. 7 is a top cross-sectional view of an airfoil that includes a plurality of capillaries.

FIG. 7 is a top cross-sectional view of airfoil 50 that may formed as part of a rotating blade or a stationary strut. As shown in FIG. 7 airfoil 50 includes a plurality of composite plies 80 that are bonded together to form a portion 82 of airfoil 50. Airfoil 50 also includes a sheet 150 that includes a plurality of capillaries 84 that are each interwoven with a composite material 152 to form sheet 150. In the exemplary embodiment, the capillaries 84 are interwoven with composite material 152 to facilitate forming a sheet 150 of capillaries.

More specifically, sheet 150 is formed using a braiding process to provide a single braided sleeve, i.e. sheet 150, that includes a plurality of integral hollow capillary tubes 84. In the exemplary embodiment, sheet 150 is biaxially braided to include unidirectional capillary tubes covering all or selected regions of the airfoil 50. The capillaries 84 exit the ends of the airfoil 50 and form the manifold region for entry and exit air. Sheet 150 therefore provides an operator with a more efficient means to install the capillaries 84 onto portion 82. As such, a time to fabricate airfoil 82 is reduced.

As shown in FIG. 7, sheet 160 including capillaries 84 is arranged between portion 82 and the external composite layer 90 that is utilized to secure the sheet 160 of capillaries to portion 82. More specifically, the capillaries 84 are arranged such that the openings 86 extend in a radial direction along the exterior surface of portion 82. As such, a heated airflow 98 is channeled from a source, such as compressor bleed air, for example, into a radially outward end 100 of airfoil 50, through opening 86, and the heated air is then discharged through a radially inward end 102 of airfoil 50, as shown in FIG. 3. After sheet 160 is positioned proximate to airfoil portion 82, a composite layer 90 is wrapped around airfoil portion 82. The airfoil assembly including airfoil portion 82, capillaries 84, and composite layer 90 are then heat treated to form a finished airfoil 50.

Figure 8:
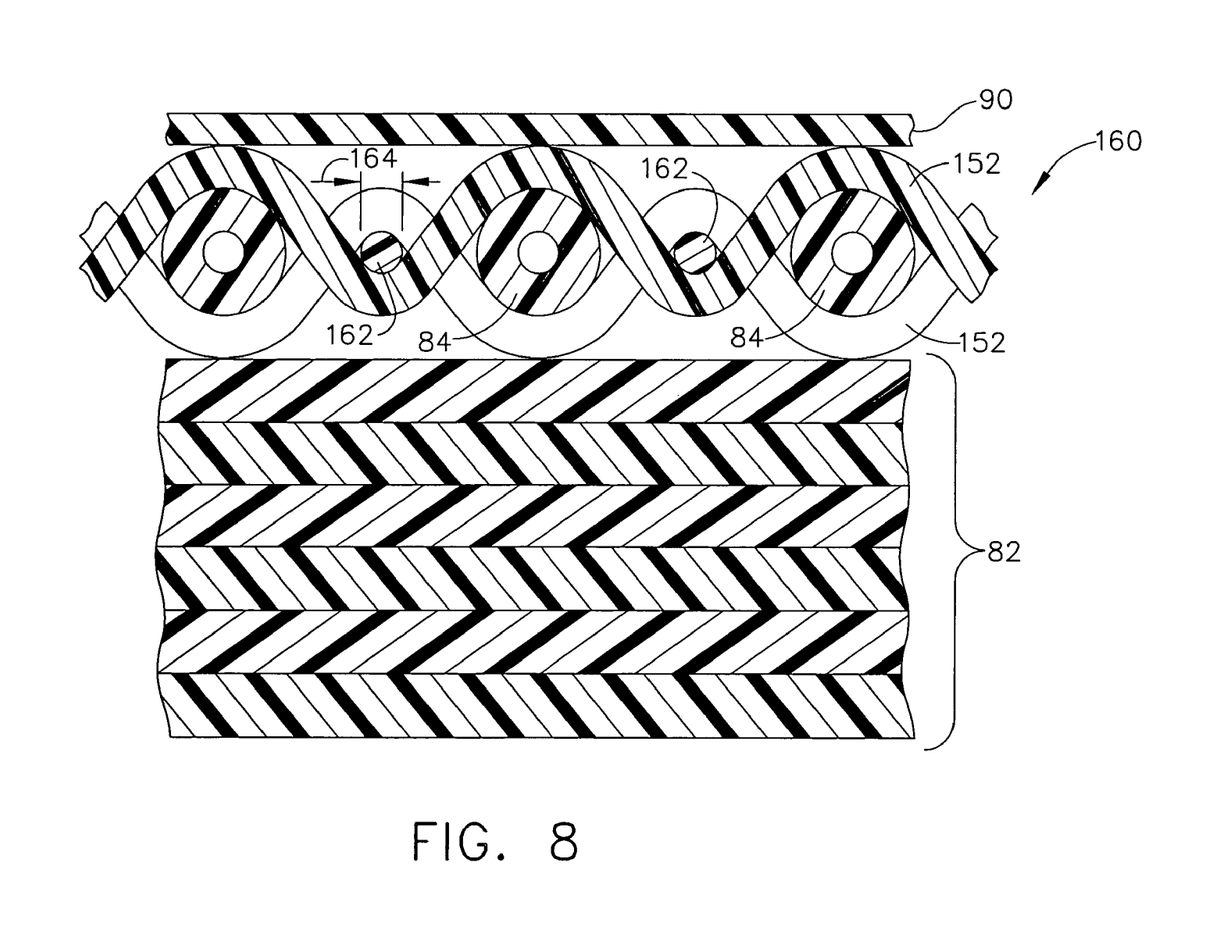
FIG. 8 is a top cross-sectional view of an airfoil that includes a plurality of capillaries.

FIG. 8 is a top cross-sectional view of airfoil 50 that may formed as part of a rotating blade or a stationary strut. As shown in FIG. 8 airfoil 50 includes a plurality of composite plies 80 that are bonded together to form a portion 82 of airfoil 50. Airfoil 50 also includes a sheet 160 that includes a plurality of capillaries 84 that are each interwoven with a composite material 152 to form sheet 160. In the exemplary embodiment, the capillaries 84 are interwoven with composite material 152 to facilitate forming a sheet 160 of capillaries. Sheet 160 therefore provides an operator with a more efficient means to install the capillaries 84 onto portion 82. As such, a time to fabricate airfoil 82 is reduced.

Sheet 160 also includes a plurality of spacers 162 that are fabricated using a substantially solid cylindrical glass material. In the exemplary embodiment, a single spacer 162 is positioned between two adjacent capillaries 84 to facilitate increasing a distance between adjacent capillaries 84. As such, each spacer 162 has an outer diameter 164 that is sized to separate adjacent capillaries 84 by a predetermined distance. Specifically, sheet 160 includes a second quantity of capillaries 84, that is less than the first quantity of capillaries shown in FIG. 6 to facilitate reducing the quantity of heated airflow that is channeled through the capillaries 84 and therefore facilitate reducing the external surface area of the airfoil that is heated. For example, as shown in FIG. 6, approximately the entire surface of airfoil 50 is heated because the capillaries 84 are each positioned adjacent each other. However, if the operational environment requires a reduced level of heating to an external surface of airfoil 50 to facilitate reducing or eliminating icing from airfoil 50, sheet 160, including spacers 162 may be utilized to provide sufficient heat to the surface of the airfoil 50. After sheet 160 is positioned proximate to airfoil portion 82, a composite layer 90 is wrapped around sheet 160. The airfoil assembly including airfoil portion 82, sheet 160, and composite layer 90 are then heat treated to form a finished airfoil 50.

Figure 9:
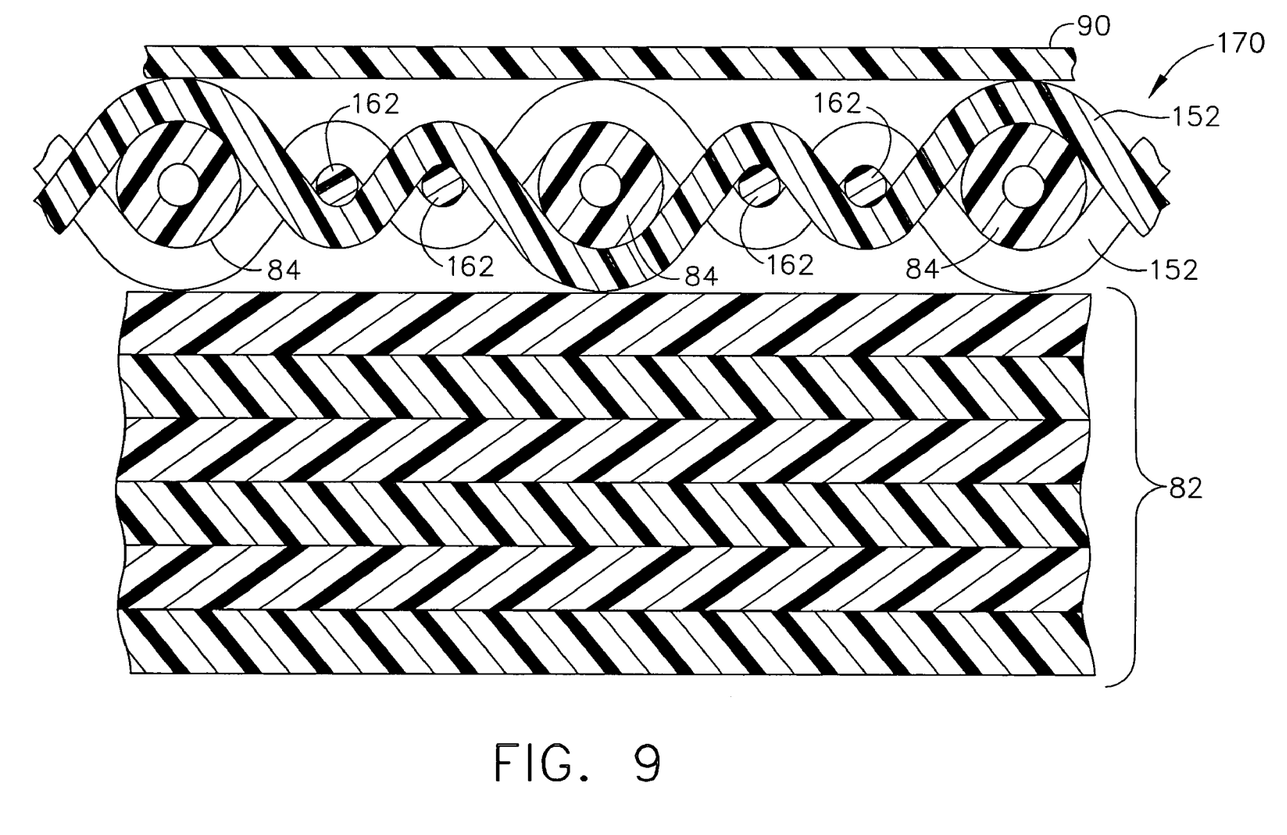
FIG. 9 is a top cross-sectional view of an airfoil that includes a plurality of capillaries.

To further reduce the quantity of heating applied to the external surface of airfoil 50, a sheet 170 may be utilized. As shown in FIG. 9, sheet 170 is substantially similar to sheet 160 and includes at least two spacers that are formed between adjacent capillaries 84. In the exemplary embodiment, at least two spacers 162 are positioned between adjacent capillaries 84 to facilitate further increasing a distance, compared to sheet 160, between adjacent capillaries 84. In the exemplary embodiment, both sheets 160 and sheet 170 are biaxially braided to include unidirectional capillary tubes 84 and spacers 162 to facilitate heating all or selected regions of the airfoil 50.

After sheet 170 is positioned proximate to airfoil portion 82, a composite layer 90 is wrapped around sheet 170 to secure the capillaries 84 to airfoil portion 82. The airfoil assembly including airfoil portion 82, sheet 170, and composite layer 90 are then heat treated to form a finished airfoil 50.

The above-described airfoil may be utilized with a gas turbine engine blade or a gas turbine engine strut. In the exemplary embodiment, a plurality of airfoils are utilized within the gas turbine engine to facilitate reducing and/or eliminating ice formation on selected portions of the gas turbine engine. The above-described airfoil is cost-effective and highly reliable in facilitating the prevention of ice accumulation along exposed surfaces of the engine. More specifically, the airfoil described herein is a one piece unitized airfoil that includes very small capillary tubes integrally braided into the airfoil wall. This invention capitalizes on the unique qualities and characteristics of the braiding process to provide a single braided sleeve with integral hollow capillary tubes. The sleeve, i.e. sheets 160 and 170, are each biaxially braided to include unidirectional capillary tubes covering all or selected regions of the airfoil. The tubes exit the ends of the airfoil and form the manifold region for entry and exit air.

As a result, the airfoil described herein facilitates eliminating the disadvantages of low transverse thermal conductivity by directing the hot air directly to or near the surface of the airfoil. The improved heat transfer allows the airfoil to have one or two benefits. The first benefit is the use of less high performance compressor bleed air, and the second benefit is the possible use of a lower temperature, lower cost resin system to fabricate the airfoil. Additionally, the entire sheet of capillaries may be molded using a variety of resin transfer molding (RTM), towpreg or equivalent techniques.

Exemplary embodiments of an gas turbine engine airfoil described above in detail. The airfoil is not limited to the specific embodiments described herein, but rather, the airfoil may be utilized with any known turbine to facilitate ice shedding.

While the invention has been described in terms of various specific embodiments, those skilled in the art will recognize that the invention can be practiced with modification within the spirit and scope of the claims.

What is claimed is:

1. A method for manufacturing a turbine engine component, said method comprising:
   forming a component to include a first side and an opposite second side;
   positioning at least one capillary adjacent to an external surface of at least one of the first and second sides, wherein the at least one capillary includes a plurality of capillaries that are biaxially braided with a composite material to form a sheet of capillaries; and
   securing the at least one capillary to the component with at least one composite layer.

2. A method in accordance with claim 1 wherein said forming a component further comprises forming a gas turbine engine airfoil to include a first side, a second side, a leading edge, and a trailing edge.

3. A method in accordance with claim 1 further comprising forming an airfoil further comprises forming a gas turbine engine strut that includes the airfoil.

4. A method in accordance with claim 1 wherein said positioning at least one capillary further comprises:
   positioning a plurality of capillaries extending from a root to a tip of the component to an external surface of at least one of said first and second sides; and
   securing the plurality of capillaries to the airfoil with at least one composite layer.

5. A method in accordance with claim 1 wherein said positioning at least one capillary further comprises:
   interweaving a plurality of capillaries and a composite material to form a sheet of capillaries;
   positioning the sheet of capillaries adjacent to an external surface of at least one of said first and second sides; and
   securing capillary sheet to the component with at least one composite layer.

6. A method in accordance with claim 5 wherein said interweaving a plurality of capillaries and a composite material to form a sheet of capillaries further comprise biaxially braiding the capillary tubes using the composite material such that the capillaries extend in a substantially uniform direction.

7. A gas turbine engine component comprising:
   an airfoil having
      a first side;
      an opposite second side;
      at least one capillary positioned adjacent to an external surface of at least one of said first and second sides, wherein said at least one capillary comprises a plurality of capillaries that are biaxially braided with a composite material to form a sheet of capillaries; and
      a composite layer securing the at least one said capillary to said component.

8. A gas turbine engine component in accordance with claim 7 wherein said airfoil comprises a gas turbine engine strut.

9. A gas turbine engine component in accordance with claim 7 wherein said airfoil comprises a gas turbine engine blade.

10. A gas turbine engine component in accordance with claim 7 wherein said airfoil comprises:
    a plurality of composite plies that are bonded together to form said first and second sides.

11. A gas turbine engine component in accordance with claim 7 wherein at least one said capillary comprises a plurality of capillaries, each said capillary comprising an opening extending therethrough that is sized to receive a heated airflow therethrough that is sufficient to reduce or eliminate ice formation on said airfoil.

12. A gas turbine engine component in accordance with claim 7 wherein said at least one capillary comprises a plurality of glass capillaries, each said capillary having an opening extending therethrough that is sized to receive a heated airflow therethrough that is sufficient to reduce or eliminate ice formation on said airfoil.

13. A gas turbine engine comprising:
   at least one airfoil including a first side and an opposite second side;
   at least one capillary positioned adjacent to an external surface of at least one said airfoil, wherein said at least one capillary comprises a plurality of capillaries biaxially braided with a composite material to form a sheet of capillaries; and
   a composite layer securing the at least one said capillary to said at least one airfoil.

14. A gas turbine engine in accordance with claim 13 wherein said airfoil comprises at least one of a gas turbine engine strut and a gas turbine engine blade.

15. A gas turbine engine in accordance with 13 wherein said airfoil comprises a plurality of composite plies that are bonded together to form said first and second sides.

16. A gas turbine engine in accordance with claim 13 wherein at least one said capillary comprises a plurality of capillaries, each said capillary comprising an opening extending therethrough that is sized to receive a heated airflow therethrough that is sufficient to reduce or eliminate ice formation on said airfoil.

17. A gas turbine engine in accordance with claim 13 wherein said at least one capillary comprises a plurality of glass capillaries, each said capillary having an opening extending therethrough that is sized to receive a heated airflow therethrough that is sufficient to reduce or eliminate ice formation on said airfoil.

* * * * *